United States Patent [19]
Davis

[11] Patent Number: 4,762,454
[45] Date of Patent: Aug. 9, 1988

[54] PERMANENT SPIKE MEMBER FOR WOODEN OBJECTS

[76] Inventor: Billy R. Davis, 1486 Francis Ave., Upland, Calif. 91786

[21] Appl. No.: 675,954

[22] Filed: Nov. 28, 1984

[51] Int. Cl.$^4$ .............................................. F16B 15/00
[52] U.S. Cl. ................................... 411/446; 411/452; 47/40.5
[58] Field of Search .............................. 411/44, 71-73, 411/446, 452, 453, 487, 488, 479, 498, 493, 500, 501, 912; 238/367, 370, 371, 448; 30/315, 316, 301; 47/42, 43, 40.5

[56] References Cited

U.S. PATENT DOCUMENTS

| | | | |
|---|---|---|---|
| 1,108,483 | 8/1914 | Abramson | 411/448 |
| 1,125,885 | 1/1915 | Rouxel | 411/54 |
| 1,806,266 | 5/1931 | Sawle | 30/301 |
| 1,978,145 | 10/1934 | Rosenberg | 411/452 |
| 2,530,399 | 11/1950 | Pilgrim | 30/316 |
| 3,233,502 | 2/1966 | Fernberg | 411/500 |
| 4,408,415 | 10/1983 | Davis et al. | 47/40.5 |

FOREIGN PATENT DOCUMENTS 211630  9/1908  Fed. Rep. of Germany ...... 411/479

Primary Examiner—Neill Wilson
Attorney, Agent, or Firm—Edgar W. Averill, Jr.

[57] ABSTRACT

A support spike securely held by and extending from a wooden object. The spike is oriented parallel to the grain of the wooden object and has an elongated shaft. A hollow longitudinal opening is formed in the point end of the spike. The spike is driven into the wooden object to an extent that the hollow opening extends past the point of entry of the spike so that the wood in the hollow opening is compressed securely holding the spike in place. The spike is particularly useful when driven into the base of a Christmas tree in order to provide a means for holding the tree in an upright position.

10 Claims, 1 Drawing Sheet

U.S. Patent     Aug. 9, 1988     4,762,454
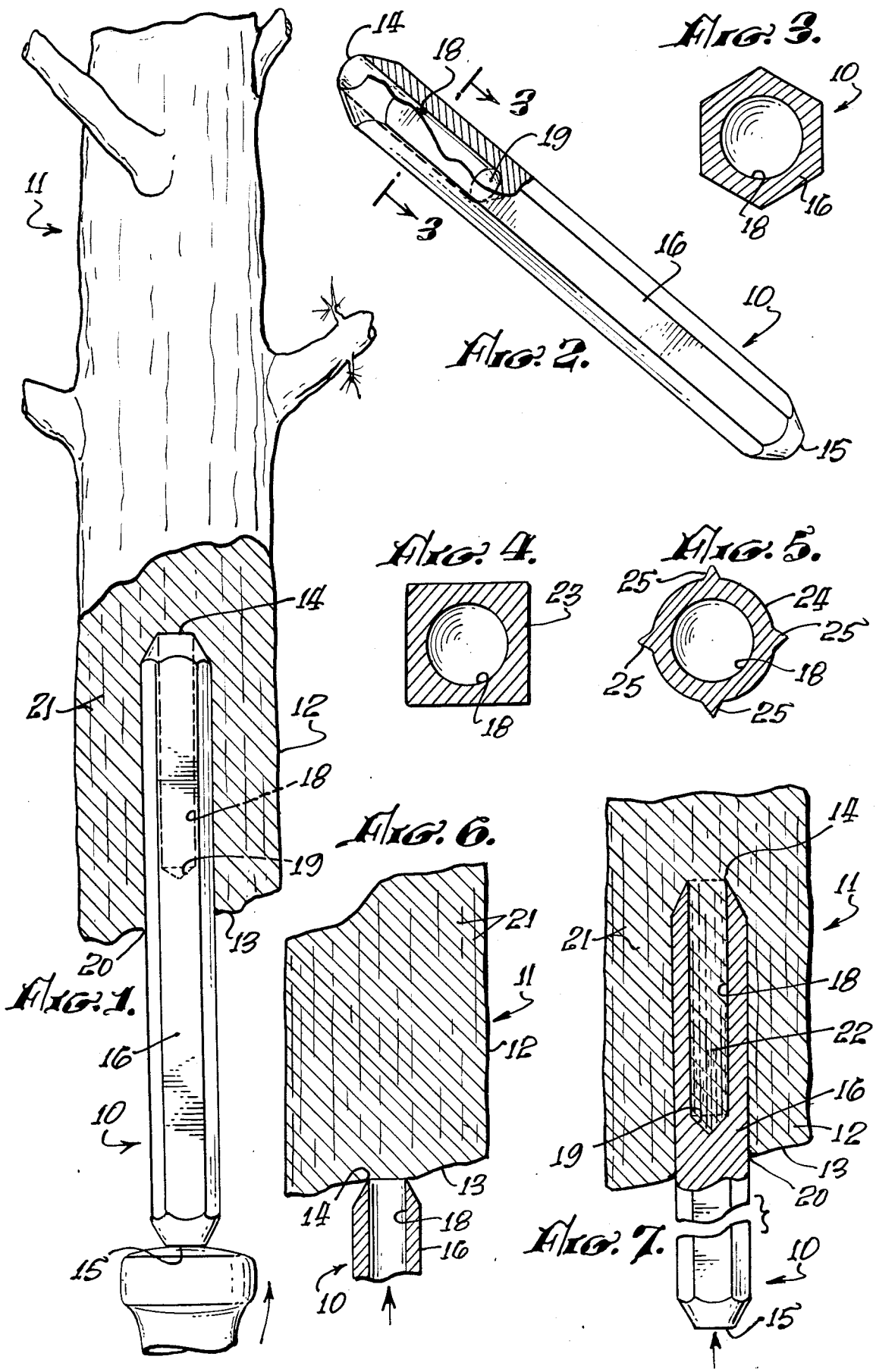

PERMANENT SPIKE MEMBER FOR WOODEN OBJECTS

BACKGROUND OF THE DISCLOSURE

The field of the invention is holding devices and the invention relates more specifically to spikes which are driven into wooden objects to provide a means for attachment of something to the wooden object or to the spike which extends therefrom.

Applicant has devised a novel Christmas Tree Stand which is the subject of U.S. Pat. No. 4,408,415. The stand utilized a gripped ball member which could be securely held in any desired orientation. The Christmas tree was affixed to the ball member by means of a spike indicated by reference character 12 in the drawings of that patent. After the spike was partly driven into the tree, the extending portion of the spike was inserted in an opening in the ball thereby holding the tree to the ball.

It has been determined that although the spike shown in U.S. Pat. No. 4,408,415 was satisfactory for many types of sizes of trees that occasionally the spike could cause a tree to split and thereby be incapable of holding the tree in the desired manner. Furthermore, occasionally the spike would not be sufficiently secured by the tree to prevent a turning of the tree which in turn would tend to weaken the grip of the spike by the tree.

SUMMARY OF THE INVENTION

It is thus an object of the present invention to provide a fastening member which may be driven into a wooden object and become securely held thereby.

The present invention is for a spike which may be fastened to a wooden member. The spike has an elongated shaft having a head and a point. The shaft has a generally constant cross-sectional shape along its length and has a maximum outside dimension of between three-sixteenths and one-half of an inch as measured in a direction perpendicular to its longitudinal axis. A cylindrical, longitudinal opening is formed in the elongated shaft at the point end thereof and extending inwardly a distance of at least one-half an inch. The opening has an inside diameter of between one-fourth and three-fourths of the maximum outside diameter of the shaft. Preferably, the spike has a non-circular cross-section to prevent or reduce the tendency of the spike to turn. The spike, when driven into a wooden object is driven inwardly sufficiently so that the internal end of the hollow opening extends past the point of entry of the spike so that wood within the hollow opening is compressed therein.

BRIEF DESCRIPTION OF THE DRAWINGS

FIG. 1 is a side view, partly in cross section of the spike of the present invention drive into the base of a tree.

FIG. 2 is a perspective view partly in cross section of the spike of the present invention.

FIG. 3 is a cross-sectional view taken along lines 3—3 of FIG. 2.

FIG. 4 is a cross-sectional view analogous to FIG. 3 showing an alternate configuration of the spike of the present invention.

FIG. 5 is a cross-sectional view analogous to FIG. 3 showing an alternate configuration of the spike of the present invention.

FIG. 6 is a side view, partly in cross section showing the point of the spike of the present invention prior to its being driven into a wooden object.

FIG. 7 is a side view, partly in cross section, showing the spike of the present invention positioned within the base of a tree.

The spike 10 of the present invention is shown in FIG. 1 after it has been driven into the base of tree 11. Tree 11 has a trunk 12 and a base 13. Spike 10 has a point 14 and a head 15. The spike shaft is indicated by reference character 16. A hammer head 17 is shown impacting spike head 15 at the bottom of FIG. 1.

As pointed out above, it was determined through experimentation that a solid spike large enough to be capable of supporting an object such as a Christmas tree would occasionally split the base of the tree into which it was driven. It was discovered that by forming a hollow opening 18 part way along the longitudinal axis of shaft 16, the splitting problem could be essentially eliminated. Surprisingly, it was also found that once the spike 10 was driven into tree trunk 12 that it became bounded to the tree in such a manner that it was almost impossible to remove or to turn thereby forming a very effective means for attachment for the tree. While not wishing to be bound by any theory, it is believed that this exceptionally secure attachment results from a compressing of the portion of the wood which is held within hollow opening 18. This is depicted in FIGS. 6 and 7 where spike 10 is inserted into tree trunk 12 a distance sufficient so that the bottom 19 of opening 18 extends past tree base 13. The intersection of tree base 13 and shaft 16 is indicated by reference character 20 which represents the point of entry of the spike. The spike, being driven parallel to the wood grain 21 tends to guide a portion of the wood into the interior of opening 18. Once the bottom of opening 19 passes the base of the tree 13, the wood 22 within hollow opening 18 is compressed. It is believed that the compression of wood 22 helps to hold spike 10 in a secure permanent position. Another advantage of the design of the present invention is that it is easily inserted to an appropriate depth in the tree. The early hammering of the spike 10 into the tree is relatively easy because wood is being forced into hollow opening 18. However once opening 18 is filled and the compression step takes place, the driving of the stake becomes more difficult at which point it has been sufficiently inserted in the tree. This makes the insertion of spikes in the base of Christmas trees in a commercial Christmas tree lot very easy because the operator can tell by sound and feel very easily when the spike has been driven sufficiently into the tree and need not attempt to match a mark on the spike with the base of the tree. For an inexperienced user, however, such mark may be beneficial and could comprise either a groove cut around the spike or other sort of indicia.

In most applications pertaining to Christmas trees, it is desirable that spike 10 be inhibited from turning or rotating about its longitudinal axis once inserted in the tree. For this reason, the spike preferably has a shaft in the shape of a polygon or other non-circular shape. A hexagonal shaft 16 is shown in the drawings with the exception of FIGS. 4 and 5 and this provides a particularly effective shape for use with a Christmas tree holder. A square shaft 23 is shown in FIG. 4 and a circular shaft 24 is shown in FIG. 5. Shaft 24 has four protrusions 25.

The shaft may be formulated from conventional materials with iron being the most logical choice due to its strength and workability as well as low cost. Other material such as stainless steel can be used if corrosion resistance is important.

For typical Christmas tree use, the hollow opening should be at least one-half an inch. Preferably, its maximum length should be no more than about three inches and preferably about one and one-half inches. The width or maximum outside dimension of the shaft of spike 10 should be at least three-sixteenths of an inch to provide sufficient strength to support an object and not more than about one-half of an inch to reduce the possibility of splitting. It is convenient to refer to the relative size of hollow opening 18 with respect to shaft 16 since the exact outside dimension of shaft 16 may vary considerably. In that regard, the inside diameter of the hollow opening should be between about one-fourth and three-fourths of the maximum outside dimension of the shaft.

A particularly useful spike was fabricated from mild steel and had an overall length of four inches and a hexagonal cross section having a width of three-eighths of an inch. The hollow opening had an opening having an inside diameter of three-sixteenths of an inch and extended downwardly from the point of the spike a distance of about one and one-half inches. When such a spike was driven into the base of a Christmas tree to an extent that the bottom of the hollow opening was one-half inch past the base of the tree, an exceptionally secure holding member resulted. It was found practically impossible to remove or turn the spike in the tree base and yet the tree was not split. The tree could then be readily held in a holder of the type shown in U.S. Pat. No. 4,408,415.

While the present invention has been described in a specific application relating to the holding of a Christmas tree, it, of course, could be applied in other environments relating to the holding of a spike longitudinally in wood. Thus, the present invention could be used to provide a dowel-like attachment in the end of a wooden structural member.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A support spike securely held by and extending from a wooden object, said spike being oriented about parallel to the grain in said wooden object and said spike comprising:
   a unitary elongated shaft having a driving end said driving end and a portion of the shaft extending outwardly from said wooden object, said shaft having a generally constant cross sectional shape along its length and having a maximum outside dimension of between three sixteenths and one-half inch as measured in a direction perpendicular to its longitudinal axis;
   a cylindrical, longitudinal opening formed in said elongated shaft, said opening containing only the wood passing therein as the spike was passed into the wooden object and said opening being axially oriented and extending from said point along said shaft a distance of at least one half inch, said opening having an inside diameter between one-fourth and three fourths of its maximum outside dimension and said opening terminating within said elongated shaft and said shaft being free from any longitudinal slits between the opening and the exterior of said shaft; and
   said spike being positioned in said wooden object a distance greater than the length of said longitudinal opening whereby the wood forced within said opening is compressed.

2. The combination of claim 1 wherein the cross sectional shape of said shaft is a regular polygon.

3. The combination of claim 2 wherein said cross sectional shape is hexagonal.

4. The combination of claim 1 wherein said cross sectional shape is square.

5. The combination of claim 1 wherein the cross sectional shape of said shaft is circular and has at least one pointed protrusion positioned thereon.

6. The combination of claim 1 wherein said opening extends at least about one inch inwardly from said point.

7. The combination of claim 6 wherein said opening extends about one and one half inch inwardly from said point.

8. The combination of claim 7 wherein said opening is about one half of the maximum outside dimension of the shaft.

9. A support spike securely held by and extending from a Christmas tree base, said spide being oriented about parallel to the grain of said tree and said spike comprising:
   a unitary elongated shaft having a driving end and a point and a portion of the shaft thereof extending outwardly from said Christmas tree base, said shaft having a generally constant cross sectional shape along its length and having a maximum outside dimension of between three sixteenths and one-half inch as measured in a direction perpendicular to its longitudinal axis;
   a cylindrical, longitudinal opening formed in said elongated shaft, said opening containing only the wood passing therein as the spike was passed into the Christmas tree base, said opening being axially oriented and extending from said point along said shaft a distance of at least one half inch, said opening having an inside diameter between one-fourth and three fourths of its maximum outside dimension and said opening terminating within said elongated shaft and said shaft being free from any longitudinal slits between the opening and the exterior of said shaft; and
   said spike being positioned in said tree a distance greater than the length of said longitudinal opening whereby the wood forced within said opening is compressed.

10. The combination of claim 9 wherein said shaft is hexagonal in cross section, the longitudinal opening is about one and one half inches in length, the inside diameter of the longitudinal opening is about one half of the width of the shaft, the shaft has a width of about three eighths of an inch and the spike is driven into the trunk of the tree a distance such that the internal end of the longitudinal opening extends about one half inch past the base of the trunk.

* * * * *